| United States Patent [19] | [11] Patent Number: 4,894,764 |
|---|---|
| Meyer et al. | [45] Date of Patent: Jan. 16, 1990 |

[54] MODULAR AC OUTPUT BATTERY LOAD LEVELLING SYSTEM

[75] Inventors: John F. Meyer, Eagle; David G. Porter, East Troy, both of Wis.

[73] Assignee: Omnion Power Engineering Corporation, Mukwonago, Wis.

[21] Appl. No.: 179,158

[22] Filed: Apr. 8, 1988

[51] Int. Cl.$^4$ .......................... H02M 7/68; H02J 9/00
[52] U.S. Cl. ...................................... 363/65; 363/71; 307/38; 307/66
[58] Field of Search .......................... 363/65, 71, 141; 307/31–41, 64, 65, 66, 58, 82, 150, 151; 361/331, 332, 333, 334, 342, 381, 384, 394, 393, 392, 391, 390, 428, 434; 251/143; 211/26, 182, 191

[56] References Cited

U.S. PATENT DOCUMENTS

| 4,291,812 | 9/1981 | Harmes et al. | 211/182 X |
| 4,363,101 | 12/1982 | Czerniejewski | 307/35 X |
| 4,498,123 | 2/1985 | Fuss et al. | 361/391 X |
| 4,553,674 | 11/1985 | Yoshikawa et al. | 211/26 |
| 4,569,451 | 2/1986 | Parrott et al. | 211/182 X |
| 4,652,769 | 3/1987 | Smith et al. | 307/31 |
| 4,732,281 | 3/1988 | Hall et al. | 211/26 |
| 4,738,632 | 4/1988 | Schmidt et al. | 361/393 X |
| 4,750,087 | 6/1988 | Carpenter et al. | 361/384 X |

OTHER PUBLICATIONS

Bechtel brochure, Lead–Acid Battery Energy Storage Systems.
R & D Status Report Energy Management and Utilization Division, EPRI Journal, Mar., 1986, pp. 48–50.
Initial Operating Characteristics of the Battery Energy Storage (BEST) Facility, by Pivec, Radimer, Hyman, Pandya and Baum, 1983.
New Battery Test Facility Features Latest DC Technology, by Alfred Berutti, EC&M, Apr., 1982.
Interim Report, Test of a 500 kWh Lead–Acid Peaking Battery at the Best Facility, 1985.
Elements of Load–Levelling Design for System Planning, by Peter A. Lewis presented at the International Symposium and Workshop on Dynamic Benefits of Energy Storage Plant Operation, 1985.
Brochure entitled Battery Energy Storage Test Facility, by BEST.
Bechtel paper, Conceptual Design and Cost Estimater 10 MW Utility Battery Facility, by Eckroad, Dodds and Stolte, Mar., 1986.
Johnson Controls brochure, Advanced Load Management System, 1987.
AT&T brochure, AT&T Power Protection Systems, 1987.
Toshiba sales flyer, Uninterruptible Power System Tosnic–U–1100 UPS/Single Phase, 1987.
Topaz brochure, New Powermaker Micro UPS, Jan., 1987.

*Primary Examiner*—Patrick R. Salce
*Assistant Examiner*—Emanuel Voeltz
*Attorney, Agent, or Firm*—Andrus, Sceales, Starke & Sawall

[57] ABSTRACT

An electric load levelling system includes a plurality of individual modules for storing and supplying AC electrical power. Each module is preferably contained within a separate enclosure and includes a plurality of individual electrochemical storage cells for storing DC electrical energy. Each enclosure includes a power conversion mechanism for converting input AC power for storage in the enclosed DC cells, and output DC power from the cells to AC for supply to an input/output line. The system is capable of storing electrical energy during periods of off-peak demand, and outputting such stored energy during periods of peak demand. The individual modules function as an "AC battery" having an AC input and output, and are adapted for mass production and ease of interchangeability.

23 Claims, 4 Drawing Sheets

MODULAR AC OUTPUT BATTERY LOAD LEVELLING SYSTEM

BACKGROUND AND SUMMARY

This invention relates to an energy storage system, and more particularly to a battery load levelling system.

A common problem for electric utilities is that demand for electrical energy is at a peak during certain hours of the day, typically between 10:00 a.m. and 3:00 p.m. Demand for electrical energy then tails off significantly during the late afternoon and evening hours, and is at its lowest during the early morning hours. A problem with this fluctuating demand for electrical energy is that, with most types of electric power plants, it is undesirable to operate such plants according to the fluctuating demand for electricity. That is, most generating plants operate optimally at a constant level of output. As a result, many electric utilities offer discounts for electricity consumed during periods of off-peak demand as an incentive for users to adjust their patterns of consumption, and thereby the load demand curve.

One way to alleviate the problems associated with fluctuating electrical demand is to store electricity produced by the generating facility during the off-peak hours, and selectively discharge such stored electricity during peak hours. This may be done either by the utility as a means for meeting increased demand during peak hours, or by a customer for taking advantage of the lower rates associated with consumption during off-peak hours. Either way the peaks and valleys in the energy demand curve are somewhat smoothed by the existence of the storage facility.

One such technology for storing electrical power produced during off-peak hours is a battery storage system. In this type of system, a large number of battery cells are charged with power produced during off-peak hours of demand, which is released to accommodate demand during peak hours. The cycle then repeats as the batteries are charged during off-peak hours and again discharged during peak hours.

A facility which utilizes the described battery storage technology is the Battery Energy Storage Test (BEST) facility in Somerset County, New Jersey. In accordance with the technology developed to date, the BEST facility utilizes a single power converter which converts the AC power supplied by the utility into DC power, which is transferred to a large number of lead-acid battery cells for storage of the DC power. To output power from the facility, DC power is transferred from the lead-acid batteries back to the single converter, and into the utility line as AC power.

A problem with the described form of battery storage system lies in the fact that the AC power input from the utility is converted at a single central converter to DC power, which is then transferred via buses, switching and other transfer components to the DC battery cells for storage. Accordingly, the wiring and switch gear between the converter and the battery cells must be constructed to handle DC power. A further problem with this type of system is that the terminals of the banks of battery cells used to store the electrical power are exposed, creating a danger to personnel in the facility as well as frequent maintenance. Yet another drawback to this type of system is that, for each application, the quantity of battery cells and the wiring, switching and other components must be designed according to the specific required capacity of a given installation. If different installations specify different capacities, then the components must be redesigned anew.

The present invention is designed to eliminate or overcome problems inherent in the above-described battery storage system. In accordance with the invention, a modular electrical load levelling system comprises a plurality of modules including means for storing DC electrical power. In one embodiment, such means for receiving and storing DC electrical power may comprise a plurality of conventional lead-acid battery cells. Power conversion means is associated with each module for converting input AC power to DC power, which is then stored in the battery cells. The power conversion means also converts output DC power from the battery cells to AC power. Power transfer means is associated with each module for inputting and outputting AC power to and from the module. Control means is provided for controlling the supply of electrical power to the system and the output of electrical power from the system. The control means, which may be a personal computer or other satisfactory electrical or electronic circuitry, is interconnected with each module for controlling the supply of power thereto and the output of power therefrom. In response to the control means, the DC power stored in the battery cells contained within each module is converted to AC power for output. The control means also acts to control the supply of power for charging the battery cells, which is preferably during periods of off-peak power demand. The control means may incorporate any satisfactory mechanism for triggering supply or discharge of power to or from the system. For example, a conventional timer clock, set according to peak and off-peak periods of demand, may be used in connection with the control means for controlling supply or output of power to or from the system.

Also in accordance with the invention, each module comprises an enclosure adapted to house one or more of the battery cells. The power conversion means associated with each module is also housed within the enclosure, to thereby provide a single modular unit capable of having both an AC power input and output. For this reason, each separate module may be termed an "AC battery". AC power is supplied directly to each module, where it is converted by the power conversion means to DC power for storage in the battery cells. To output electrical power, the DC power is processed through the power conversion means to AC power, which is then output from the module. The modules can efficiently be factory produced en masse, and the connections between the battery cells and the power converter can likewise be factory made to eliminate or greatly reduce the need for maintenance thereof.

The battery load levelling system of the invention preferably incorporates a plurality of modules as above described. AC power is output from each individual module, which thereby eliminates the necessity for DC connections, wiring and hardware usually associated with batteries. Further, the terminals of each DC battery cell are concealed within the enclosure which makes for a clean and safe environment for the system.

An important advantage of the AC battery of the invention is that the power terminals may be shorted together without damaging the module or creating a personnel hazard. This is far different than a DC battery, which can typically supply very high electrical currents and/or rupture when shorted, thereby creating potential for serious personal injury. The AC battery terminals can be shorted due to the utilization of solid state switches, which are normally open, between the stored DC energy and the AC terminals.

The wiring and connections for the series of modules can be conventional AC wiring, which is inherently safer than DC. Further, the switching and other necessary electrical components are also AC type components, which make field installation much safer than in DC applications.

The modular construction of the battery load levelling system of the invention provides reduced engineering and other one-time costs associated with installation of such a system. That is, for different capacities desired by a user, the user needs only purchase enough modules to accommodate this capacity. If another user requires a different capacity, a satisfactory number of modules is provided. The only practical variation between installations of different capacities is the number of modules required.

The invention also contemplates an efficient and convenient arrangement for storing and stacking the plurality of modules utilized in the system, which also addresses the problem of conduit and cable placement. In accordance with this aspect of the invention, rack means is utilized to support the plurality of modules. A plurality of conduits are provided to supply AC power to and discharge AC power from the modules. The rack means is provided with conduit support means for supporting the conduits. In one embodiment, the rack means includes a series of vertical and horizontal support members for supporting the modules. The conduit support means is incorporated into the support members, and in one embodiment the conduits are physically placed inside the support members. With the construction, separate trays and raceways for the conduit and cables are unnecessary, and the routing of such components inside the rack structure provides a less cluttered, less costly system.

BRIEF DESCRIPTION OF THE DRAWINGS

The drawings illustrate the best mode presently contemplated of carrying out the invention.

In the drawings.

DESCRIPTION OF THE PRIOR ART

Figure 1:
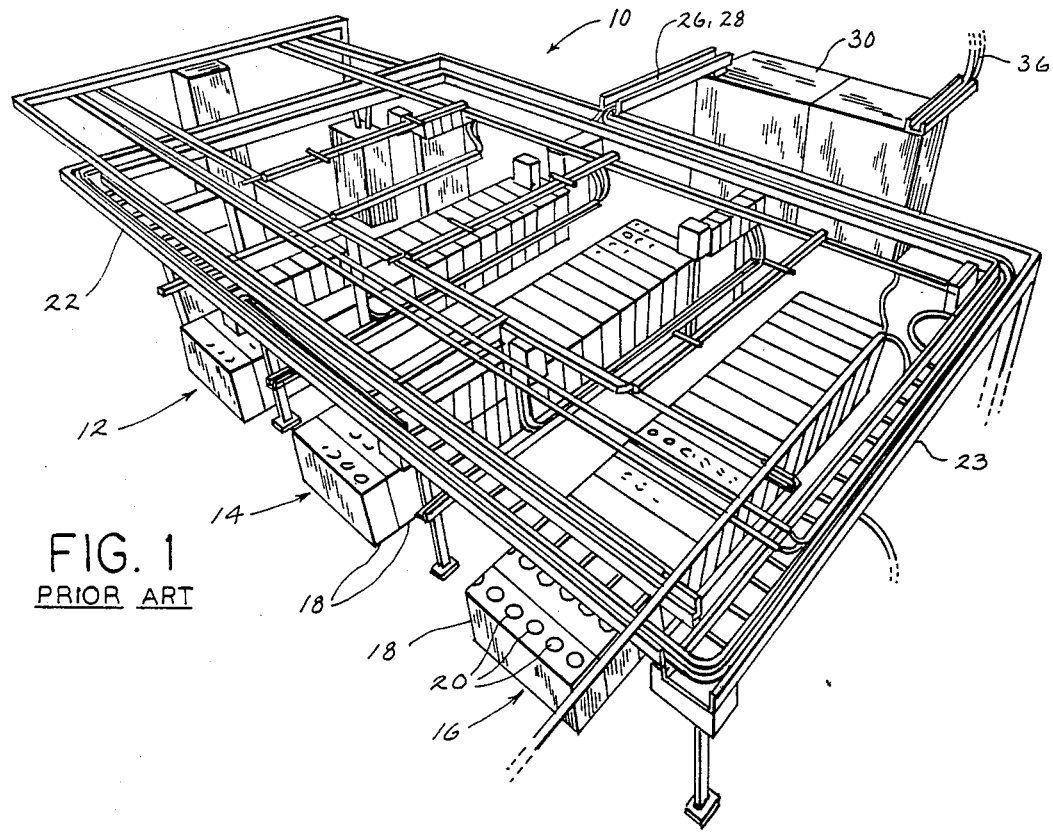
FIG. 1 is a perspective view showing a prior art battery load levelling system, such as that installed at the noted BEST facility.

As shown in FIG. 1, a battery load levelling system 10 includes a series of battery strings 12, 14, 16. Each battery string contains a plurality of individual battery cells housed within a series of open-top containers 18. Each cell has a terminal, such as shown at 20, as is known.

Cable trays, such as 22, 23 provided above battery strings 12, 14, 16 provide a raceway for cables and other electrical conduits associated with system 10.

Figure 2:
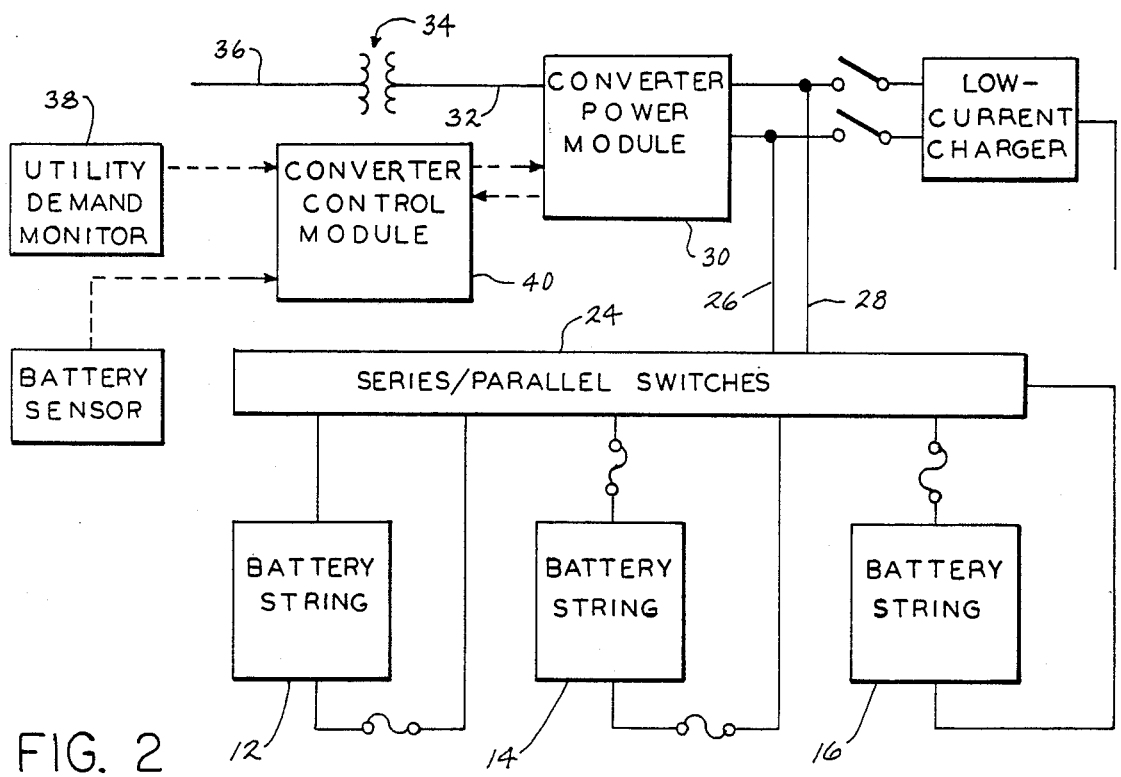
FIG. 2 is a schematic diagram of the load levelling system shown in FIG. 1.

Each of battery strings 12, 14, 16 is interconnected with a series of DC switches, shown schematically in FIG. 2 at 24, and through DC buses 26, 28 to a converter module 30. Converter module 30 converts DC power supplied from battery strings 12, 14, 16 to AC power, and also converts AC power supplied through an input/output line 32 to DC power for supply to battery strings 12, 14, 16. A transformer 34 is provided between system 10 and a utility line 36 interconnected with an electric utility.

A demand monitor 38 is interconnected with a converter control module 40, which controls converter module 30 in response to demand of the electric utility to which system 10 is connected.

DETAILED DESCRIPTION OF THE PRESENT INVENTION

Figure 3:
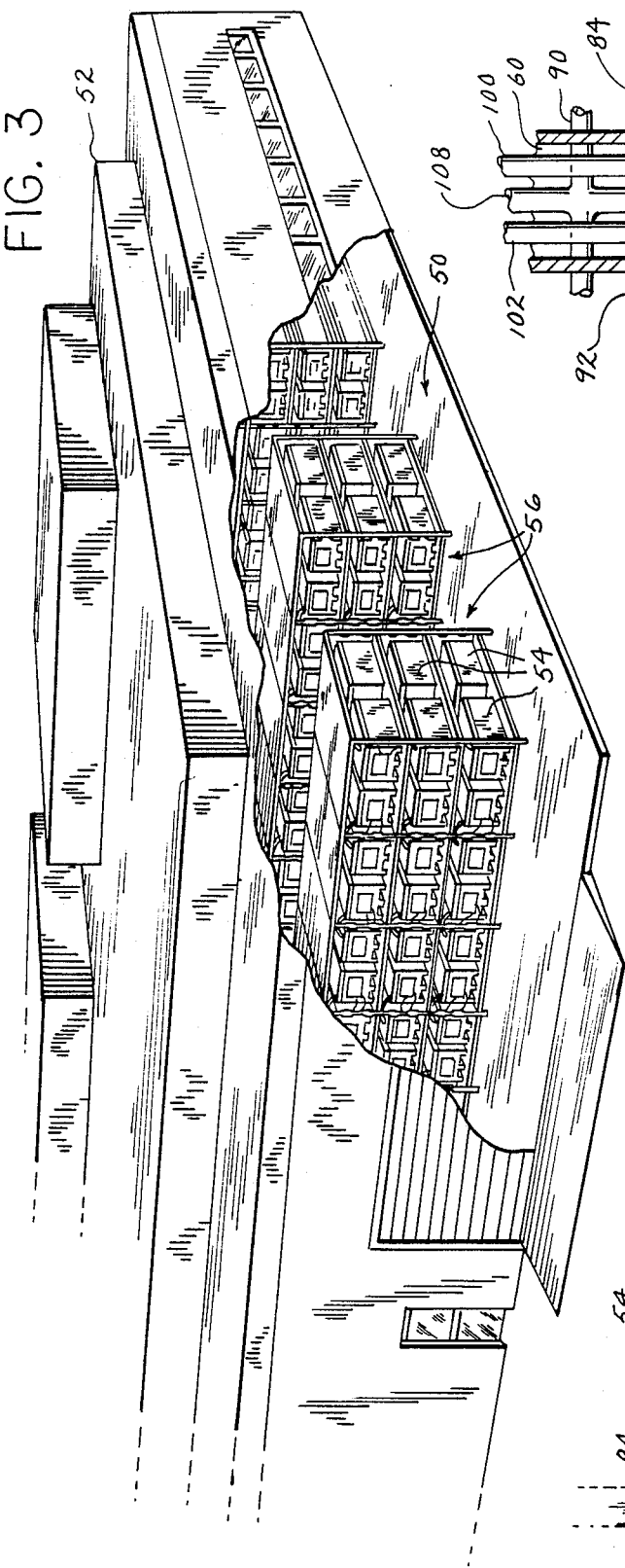
FIG. 3 is an isometric view of a battery load levelling installation constructed according to the present invention, with a portion broken away.

As shown in FIG. 3, a modular battery load levelling system constructed according to the invention is shown at 50. Modular system 50 is housed within an installation building 52, and includes a series of battery storage modules, shown at 54, adapted to be shelved on conventional pallet rack shelving, shown generally at 56. This arrangement allows compact and efficient organization of modules 54.

Figure 4:
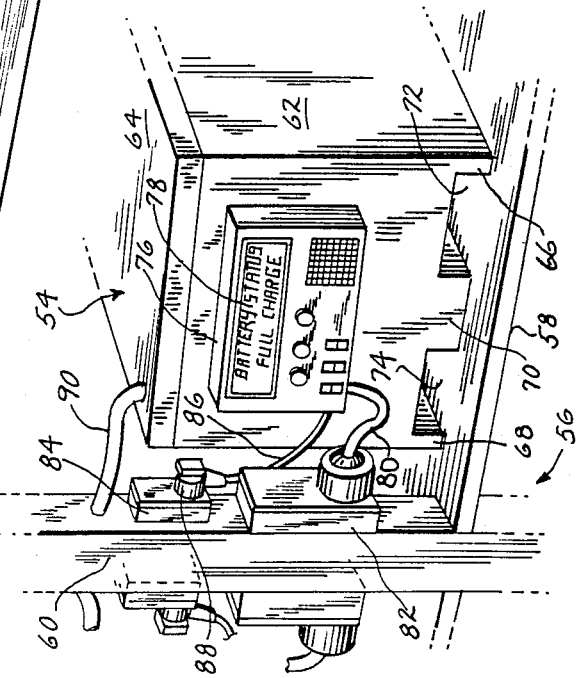
FIG. 4 is a partial isometric view showing an individual module and its connections from the system of FIG. 3.

As shown in FIG. 4, each module 54 is supported by a horizontal support member 58 provided on shelving 56. Horizontal support member 58 is interconnected with and supported by a vertical support member 60, which is spaced from an identical vertical support member supporting the other end of horizontal support member 58.

Each module 54 includes an enclosure having a lower portion 62 and a cover portion 64, which is adapted to be secured in any satisfactory manner to lower portion 62. The enclosure may be constructed of any satisfactory material, such as a rigid plastic or metal. Lower portion 62 houses one or more battery cells, which may be of any accepted satisfactory construction. For example, the battery cells housed within module 54 may be of the conventional lead-acid type. It should be understood, however, that any satisfactory battery technology may be utilized.

Lower portion 62 of module 54 preferably includes a pair of outer depending legs 66, 68, which space the bottom of lower portion 62 above horizontal support member 58. Legs 66, 68 are aligned with the sides of lower portion 62. A central leg 70 is also provided for spacing module 54 above horizontal support 58. With this construction, a pair of slots 72, 74 are thereby formed between outer legs 66, 68 and central leg 70. Slots 72, 74 are adapted to receive the tines of a conventional forklift or other such lifting mechanism, to accommodate movement and placement of module 54. It should be understood that any satisfactory structure may be incorporated to facilitate or accommodate handling of the modules.

With further reference to FIG. 4, module 54 is provided with a diagnostic box 76 which includes display 78. Box 76 is interconnected with the battery cells housed within module 54, and is capable of providing a visual display as to the status of the battery cells, e.g. the percent of full charge currently being carried by the battery cells, whether the cells are charging or discharging, etc. In a simpler version, box 76 is provided with a pair of LED cells. One LED, which may be tinted green, is illuminated when the components of module 54 are operating properly. Another LED, which may be tinted red, is illuminated to indicate that module 54 is malfunctioning.

An input/output cord 80 is interconnected between box 76 and a conventional AC power receptacle 82 mounted to vertical support member 60. Cord 80 is a bidirectional cord which both inputs AC power to and outputs AC power from module 54.

A control receptacle 84 is mounted to vertical support member 60 in a manner similar to receptacle 82. A control cable 86 is connected to control receptacle 84 via a connector 88. Control receptacle 84 is interconnected with a central information processing unit, as will be explained, which controls the flow of AC power to and from module 54.

A ventilation hose 90 is connected to cover portion 64 of module 54. Hose 90 may alternatively be attached to lower portion 62 at a satisfactory location. Hose 90 conveys negative air pressure to the interior of module 54 for ventilating the battery cells contained therein. In this manner, harmful gases and/or heat which may be produced by the battery cells contained within module 54 may be removed and vented to the atmosphere.

Figure 5:
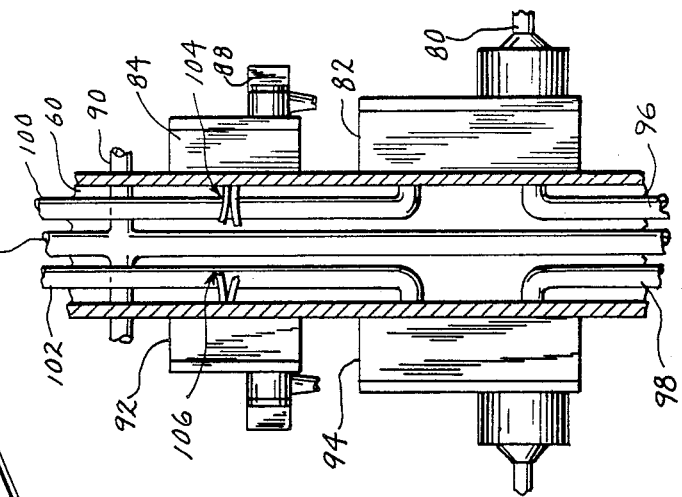
FIG. 5 is a partial sectional view showing the internal construction of the components shown in FIG. 4.

With reference to FIG. 5, it is seen that control receptacle 84 is mounted to vertical support member 60 opposite a like control receptacle, shown at 92, provided for a neighboring module 54. Similarly, receptacle 82 is mounted to vertical support member 60 opposite a like receptacle, shown at 94, for the neighboring module. An input/output conduit 96 is interconnected with receptacle 82, and is adapted to supply AC power to and discharge AC power from an adjacent module 54 therebelow. Likewise, an input/output conduit 98 is adapted to supply AC power to and discharge AC power from an adjacent module 54 therebelow. With the construction as shown, receptacles 82, 94 act as junction boxes. An input/output conduit 100 is interconnected with receptacle 82, and an input/output conduit 102 is interconnected with receptacle 94. Conduits 100-102 are adapted to supply power to and discharge power from the modules disposed therebelow. As shown, conduits 96, 98 and 100, 102 are housed within the interior of vertical support member 60 of shelving 56. In this manner, the wiring associated with modules 54 can be concealed to eliminate clutter resulting from exposed cable and raceways. It is understood that the wiring contained within conduits 96-102 may not require conduit.

In a manner similar to that described above, the wiring associated with control receptacles 84, 92, shown generally at 104, 106, respectively, can be concealed within the interior of vertical support member 60 of shelving 56. This further reduces clutter caused by exposed wiring.

As an alternative to the arrangement shown, a single control receptacle and a single power receptacle, each having two or more connections, may be utilized for adjacent modules.

The ventilation system for the power modules is also adapted to be housed within the interior of the vertical support members 60 of shelving 56. As shown in FIG. 5, the ventilation system may include a central vacuum trunk 108 from which branches, such as hose 90, extend for interconnection with the individual modules 54. The vacuum trunk associated with each vertical support member provided on the various shelving units are interconnected through a collector assembly for ultimate discharge to atmosphere.

Figure 6:
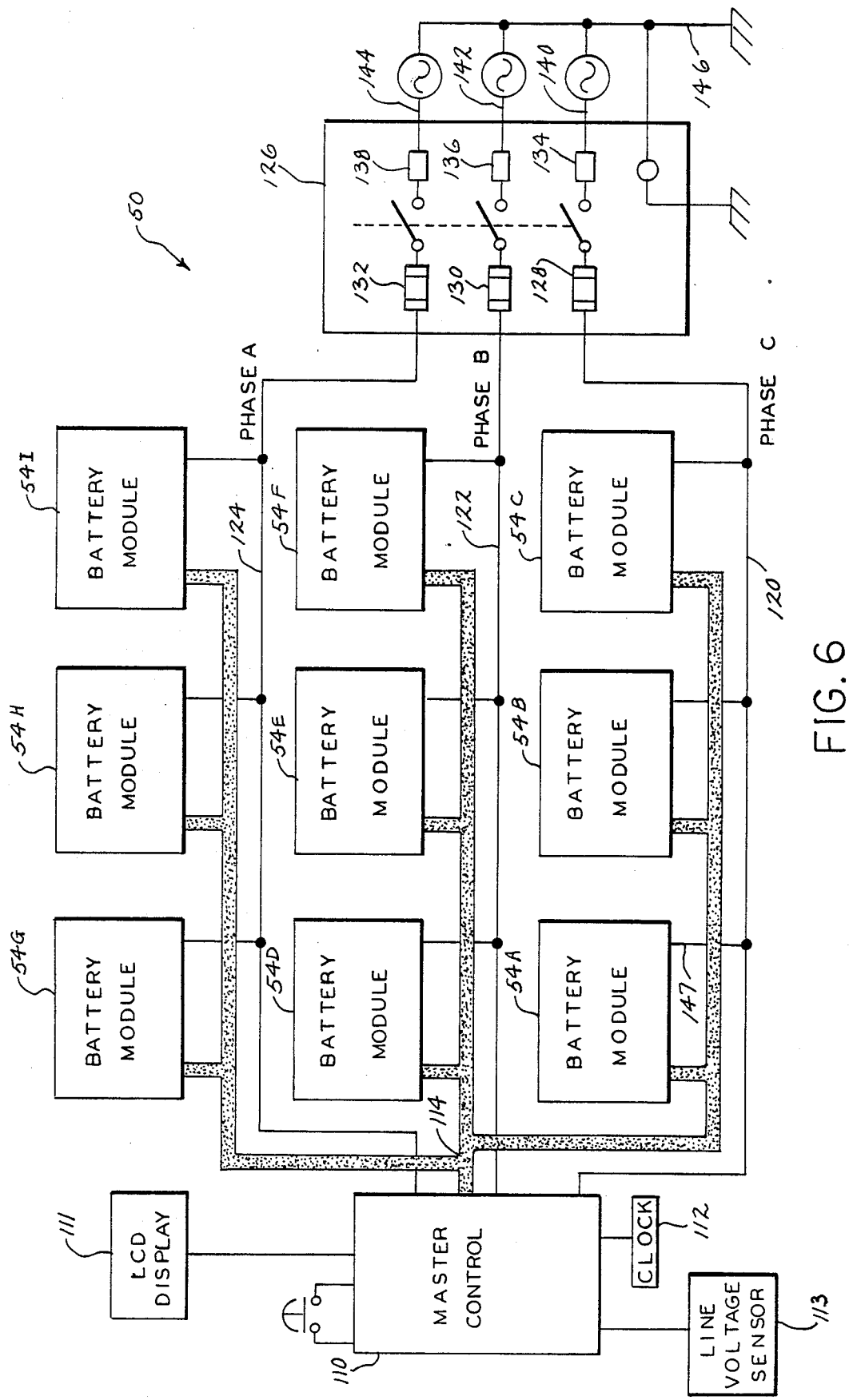
FIG. 6 is a representative schematic showing a modular load levelling system constructed according to the present invention.

FIG. 6 schematically illustrates the interconnection of the various components of the modular battery load levelling system 50 of the invention. As shown, system 50 may include a plurality of power modules 54 for receiving, storing and discharging AC electrical power. For example, system 50 may comprise modules 54A, 54B, 54C, 54D, 54E, 54F, 54G, 54H and 54I. Such an arrangement would provide a relatively small scale battery storage load levelling system, but is satisfactory for explanation of its operation. It should be understood, however, that any number of modules may be incorporated into a system constructed according to the invention. With the arrangement as shown, a balanced three phase output is provided. Modules 54A-54C supply one phase, modules 54D-54F supply a second phase, and modules 54G-54I supply a third phase.

As shown, modules 54A-54C are arranged in one side bank, modules 54D-54F are arranged in a central bank, and modules 54G-54I are arranged in another side bank. A central master control, shown at 110, is provided for controlling the supply of AC power to modules 54A-54I and discharge of AC power therefrom. Central control 110 may be any satisfactory means for controlling system 50, and in an exemplary application may be a personal computer equipped with satisfactory software, or other satisfactory microprocessor. Control 110 is provided with a display 111 which is capable of providing information such as power output from the system, input to the system, and diagnostic characteristics of the various power modules and other components of the system. Control 110 may be interconnected with a timer clock 112, which may be set according to known peak and off-peak periods of demand. Clock 112 acts to trigger central control 110 to operate system 50 to receive power during times of off-peak demand, and to output power at times of peak demand.

A line voltage sensor 113 is interconnected between control 110 and the utility supply line. Sensor 110 acts to shut down system 50 in response to absence of line voltage, frequency variations which are out of tolerance, or other undesirable operating characteristics sensed in the utility line. With this feature it is ensured that voltage is not supplied to the utility line when the primary source of power to the line is disconnected.

Control 110 is interconnected via a bus 114 to modules 54A-54I, each of which is equipped with a local control responsive to central control 110. The local controls for each of modules 54A-54I are interconnected with the power conversion mechanism associated with each module, and trigger the power converter when AC power is supplied to or output from the module.

As shown, each of modules 54A-54I is interconnected via an input/output line to a collecting line. As shown, modules 54A-54C output AC power to and receive AC power from a line 120, modules 54D-54F output AC power to and receive AC power from a line 122, and modules 54G-54I output AC power to and receive AC power from a line 124. Supply/distribution lines 120, 122 and 124 are interconnected with a distribution panel 126 which includes a series of fuses, circuit breakers or other protective devices, shown at 128, 130, 132 for lines 120, 122, 124, respectively. Distribution panel 126 also is provided with a series of terminal blocks 134, 136, 138, to which lines 140, 142, 144 are connected for outputting AC power,therefrom. Lines 140, 142, 144 are interconnected with a utility line 146 which is interconnected with the utility. It should be understood that the system shown and described is as would be utilized by an electric utility for shaving the peaks of the power demand curve. With this system, line 146 interconnects the system with the electric utility. In a different application, such as a customer side of the meter application, a separate output line interconnects the system with the customer's system.

Figure 7:
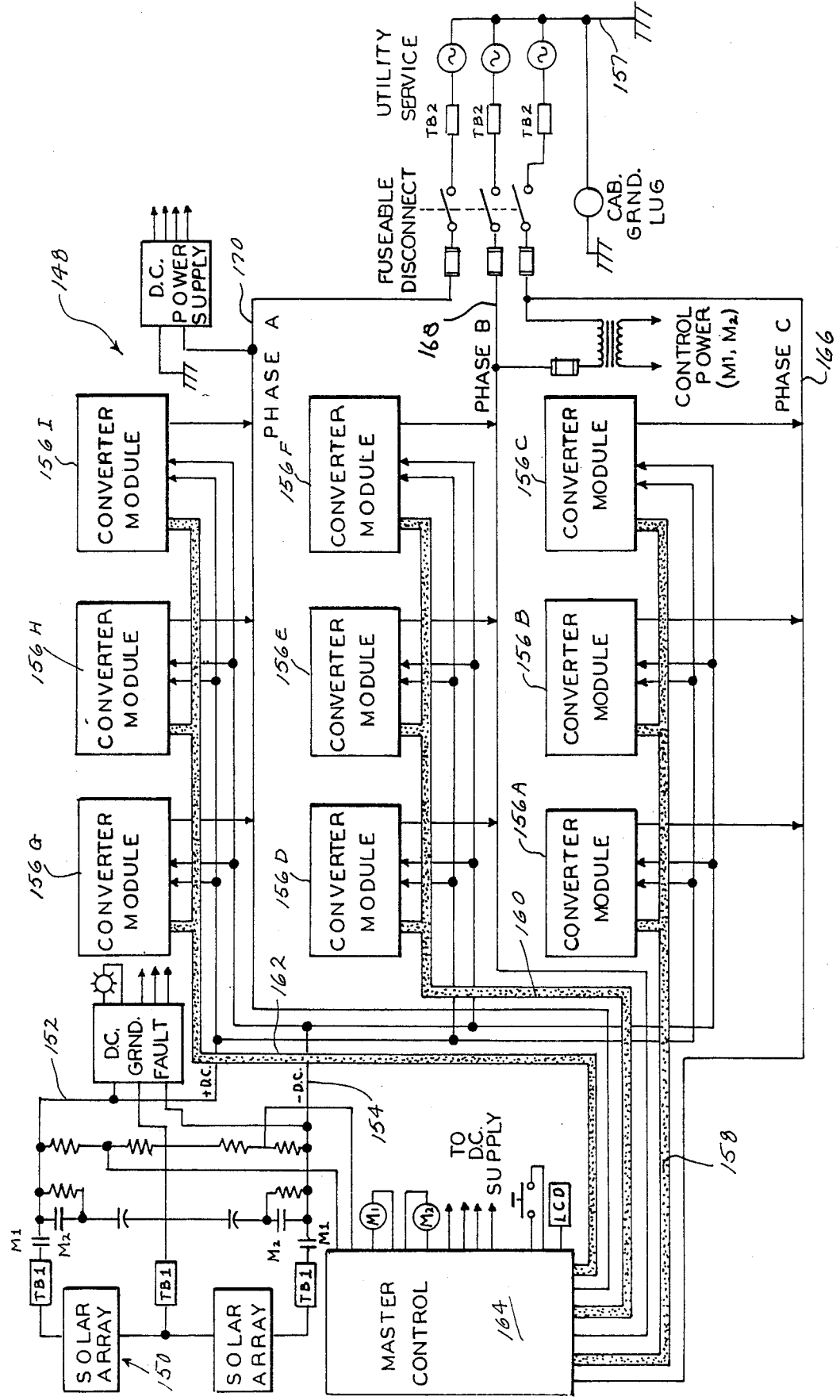
FIG. 7 is a schematic representation of a prior art solar photovoltaic system which utilizes a plurality of converter modules for converting DC power from a solar array to output AC power.

FIG. 7 illustrates a prior art photovoltaic power conversion system 148, such as that produced by Omnion Power Engineering Corporation of Mukwonago, Wisconsin under its designation Series 3200. In this system, a solar array 150 provides DC power through a pair of DC buses 152, 154 to a series of converter modules 156A-156I. Converter modules 156A-156I convert input DC power from solar array 150 to AC power for output for ultimate supply to a utility line 157. Control cables, such as 158, 160, 162 are provided between a central control 164 and converter modules 156A-156I. Central control 164 is responsive to the presence or absence of voltage in the circuitry associated with solar array 150 for controlling the supply of DC power therefrom to converter modules 156A-156I and the output of AC power from converter modules 156A-156I to AC lines 166, 168, 170, which are interconnected with utility line 157.

The power conversion circuitry utilized in connection with converter modules 156A-156I of photovoltaic conversion system 148 may satisfactorily be utilized in connection with system 50 of the invention.

However, it is to be understood that any satisfactory power conversion technology may be utilized, without limitation to that used in connection with the described system.

In exemplary operation, system 50 of the invention works as follows. During off-peak hours of electrical demand, AC electrical power is input from the electric utility through utility line 146, lines 140-144, distribution panel 126, and supply/distribution lines 120-124. Such AC power is then input to modules 54A-54I through the AC input/output line, shown at 147 in connection with module 54A. The AC input power is converted to DC power through the power conversion circuitry associated with each of modules 54A-54I, and the DC power is input to the battery cells associated with each module 54A-54I through buses connected therebetween. In this manner, the battery cells associated with each module 54A-54I are charged during periods of off-peak demand by storing power from the electric utility. The central control 110 acts to control the supply of electric power to modules 54A-54I. The power is then stored in each of modules 54A-54I, until it is determined that it is necessary or desirable to discharge the stored power therefrom, for example in response to timer clock 110. Upon actuation of the local control associated with each of modules 54A-54I by the central control 110, power is allowed to be output from the modules. To allow power output, DC power flows from the battery associated with each module through the power conversion circuitry associated therewith, where it is converted to AC power. Such AC power is then routed from each module to the AC lines 120-124, through distribution panel 126, and lines 140-144 to utility line 146.

It should be appreciated that the triggering mechanism for system 50 of the invention, described as a timer clock 112, may be replaced by any satisfactory actuating mechanism or system. For example, system 50 may be tied into an energy management system owned by a customer and installed in conjunction with the electricity-consuming systems of a facility. In an application such as this, system 50 of the invention simply becomes another item interconnected with the energy management system along with other systems such as heating, ventilating and air conditioning.

It should further be appreciated that the system of the invention can function as an uninterruptible power system (UPS), often used in connection with critical equipment which is sensitive to power supply interruptions. That is, in the event of a power outage resulting in no power input to the system, power can nonetheless be output from the modules for maintaining a supply of power to critical equipment. In contrast to a conventional UPS, however, the present invention is capable of furnishing power back to the utility, if desired, when the utility is operating normally.

Various alternatives and modifications are contemplated as being within the scope of the following claims particularly pointing out and distinctly claiming the invention.

We claim:

1. An electrical load levelling system, comprising:
    a plurality of modules, each having an AC power input and an AC power output;
    electrical energy storage means associated with each said module, said energy storage means having a DC power input and a DC power output;
    power conversion means associated with each said module for converting output DC power from said energy storage means to AC power for output from said module, and input AC power to said module to DC power for input to said energy storage means;
    power transfer means associated with each said module for inputting and outputting said AC power to and from said module; and
    control means for controlling the supply of AC power to said system and the output of AC power from said system;
    so that said system is adapted to receive electrical energy during periods of off-peak electrical demand, store said electrical energy until demand exists for said stored electrical energy and said demand is detected by said control means, and output electrical energy in response to said demand.

2. The system according to claim 1, wherein said control means comprises an information processing unit interconnected with each said module.

3. The system according to claim 1, wherein said electrical energy storage means comprises electrochemical storage means.

4. The system according to claim 3, wherein each said module comprises an enclosure, and wherein said electrochemical storage means comprises one or more battery cells housed within said enclosure.

5. The system according to claim 4, wherein said power conversion means associated with each said module is housed within the enclosure of each said module.

6. The system according to claim 4, wherein each said enclosure is capable of providing movability of each said module independent of other said modules.

7. The system according to claim 6, wherein each said enclosure includes support means capable of allowing transport of each said battery module by forklift truck.

8. The system according to claim 7, wherein said support means comprises a pair of spaced downwardly extending legs extending below the bottom of said enclosure.

9. The system according to claim 8, wherein said legs are provided adjacent the sides of said enclosure.

10. The system according to claim 4, further comprising ventilation means associated with each said enclosure for ventilating said enclosure.

11. The system according to claim 10, wherein said ventilation means comprises a duct conveying a negative air pressure to the interior of each said enclosure.

12. The system according to claim 11, wherein each said duct is interconnected with a central discharge duct for discharging air collected from said enclosures.

13. The system according to claim 4, wherein said enclosures containing said one or more battery cells are supported by one or more shelving units.

14. The system according to claim 13, wherein said shelving units provide a plurality of tiers of said enclosures so as to provide a stacked arrangement for said enclosures, said shelving units including support means for supporting shelving on which said enclosures rest, and wherein said support means is adapted to carry conduit means interconnected with said modules for supplying and outputting power to and from said modules.

15. The system according to claim 14, wherein said support means comprises two or more spaced vertical members with one or more horizontal members spanning therebetween and connected thereto for supporting said shelving, and wherein said conduit means is housed within the interior of one of said vertical members.

16. The system according to claim 14, wherein said control means comprises a central information processing unit and a plurality of buses interconnecting said central processing unit with said modules, and wherein said plurality of buses are housed within said shelving support means.

17. The system according to claim 1, further comprising visual indicator means provided on each said module for providing a visual indication of the operability of each said module.

18. The system according to claim 17, wherein said visual indicator means comprises a display for conveying diagnositc information relative to the operability of each said module.

19. In a battery load levelling system for connection to an AC power source, said load levelling system including one or more battery cells each being adapted to selectively receive, and selectively discharge DC electrical power, the improvement comprising an enclosure for housing one or more of said battery cells, each said enclosure including power conversion means housed therein for converting input AC power from said AC power source to DC power for storage in said one or more battery cells, and for converting DC power from said one or more battery cells to output AC power.

20. The improvement according to claim 19, wherein each said enclosure is provided with disconnectable AC power transfer means interconnected with said power conversion means for inputting AC power thereto and outputting AC power therefrom.

21. The system according to claim 20, wherein, upon disconnection of said power transfer means, each said enclosure is portable by conventional material handling equipment.

22. A battery load levelling system, comprising:
a plurality of energy storage modules adapted to selectively receive and selectively discharge electrical power, said modules being adapted to receive AC power and to output AC power;
rack means for supporting said plurality of energy storage modules;
a plurality of power transfer conduits for supplying power to said modules and discharging power from said modules;
conduit support means associated with said rack means for supporting said power transfer conduits;
a receptacle mounted to said rack means adjacent each said energy storage module, each said receptacle being interconnected with one of said power transfer conduits; and
cord means associated with each said module for inputting and outputting AC power to and from said module, said cord means being connectable and disconnectable to and from one of said receptacles;
wherein said modules may be individually removed from said system by disconnection of said cord means without disruption to said system.

23. The improvement according to claim 22, wherein said rack means includes two or more spaced vertical support members and one or more horizontal support members spanning therebetween and connected thereto for supporting said modules, and wherein said conduit support means is housed within said support members.

* * * * *

UNITED STATES PATENT AND TRADEMARK OFFICE
CERTIFICATE OF CORRECTION

PATENT NO. : 4,894,764

DATED : January 16, 1990

INVENTOR(S) : John F. Meyer at al

It is certified that error appears in the above-identified patent and that said Letters Patent is hereby corrected as shown below:

Claim 19, Col. 10, Line 6, after "receive" delete ","

Signed and Sealed this

Twenty-fifth Day of June, 1991

*Attest:*

*Attesting Officer*

HARRY F. MANBECK, JR.

*Commissioner of Patents and Trademarks*